(12) United States Patent
 Sol

(10) Patent No.: US 10,855,772 B2
(45) Date of Patent: Dec. 1, 2020

(54) VEHICLE, HUB APPARATUS, AND COMMUNICATION SYSTEM INCLUDING THE SAME

(71) Applicants: HYUNDAI MOTOR COMPANY, Seoul (KR); KIA MOTORS CORPORATION, Seoul (KR)

(72) Inventor: Unhwan Sol, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 115 days.

(21) Appl. No.: 15/970,909

(22) Filed: May 4, 2018

(65) Prior Publication Data

US 2019/0190991 A1    Jun. 20, 2019

(30) Foreign Application Priority Data

Dec. 14, 2017  (KR) ................. 10-2017-0172002

(51) Int. Cl.
 *H04L 29/08*  (2006.01)
 *G08C 17/00*  (2006.01)
 *G06F 21/30*  (2013.01)
 *H04W 76/10*  (2018.01)
 *H04W 84/10*  (2009.01)

(52) U.S. Cl.
 CPC .......... *H04L 67/125* (2013.01); *G06F 21/305* (2013.01); *G08C 17/00* (2013.01); *H04W 76/10* (2018.02); *H04W 84/10* (2013.01)

(58) Field of Classification Search
 CPC ..... H04L 67/125; H04W 76/10; G06F 21/305
 See application file for complete search history.

(56) References Cited

U.S. PATENT DOCUMENTS

| | | | |
|---|---|---|---|
| 9,963,106 B1 * | 5/2018 | Ricci ................... | B60R 25/2018 |
| 2008/0266051 A1 * | 10/2008 | Taki .................... | B60R 25/2009 340/5.1 |
| 2011/0183601 A1 * | 7/2011 | Hannon ................. | H04K 3/415 455/1 |
| 2015/0208489 A1 * | 7/2015 | Dijk ..................... | H05B 47/175 315/294 |
| 2016/0316502 A1 * | 10/2016 | DeCicco ................ | H04W 4/80 |
| 2017/0257794 A1 * | 9/2017 | Kim ...................... | H04W 4/80 |
| 2017/0285596 A1 * | 10/2017 | Hunt ..................... | G05B 15/02 |
| 2018/0338274 A1 * | 11/2018 | Gallagher ............. | H04W 48/02 |

* cited by examiner

*Primary Examiner* — Jeong S Park
(74) *Attorney, Agent, or Firm* — Morgan, Lewis & Bockius LLP

(57) ABSTRACT

A communication system comprises: a hub apparatus configured to communicate with at least one external device; a terminal configured to establish a connection with the hub apparatus to control the at least one external device; and a vehicle configured to establish a connection with the hub apparatus to control the at least one external device, determine whether there is an overlapped control target with a control target of the terminal among the at least one external device, and when it is determined that there is the overlapped control target, take priority to control the overlapped control target.

16 Claims, 7 Drawing Sheets

VEHICLE, HUB APPARATUS, AND COMMUNICATION SYSTEM INCLUDING THE SAME

CROSS-REFERENCE TO RELATED APPLICATION

This application is based on and claims priority under 35 U.S.C. § 119 to Korean Patent Application No. 10-2017-0172002 filed on Dec. 14, 2017, in the Korean Intellectual Property Office, the disclosure of which is incorporated herein by reference in its entirety.

TECHNICAL FIELD

The present disclosure relates to a vehicle, hub apparatus, and communication system having the vehicle and the hub apparatus, and more particularly, to a vehicle, hub apparatus, and communication system capable of controlling a networked external device.

BACKGROUND

The Internet has been developed for computers operated by human to communicate with one another through Transmission Control Protocol/Internet Protocol (TCP/IP), but recently, studies are being conducted for all kinds of objects that may be identified and capable of computation and communication to perform communication over the Internet. This technology that allows all kinds of things to perform communication is called the Internet of Things (IoT).

The IoT is a more evolved stage than the existing Internet based on wired communication or the mobile Internet, allowing devices connected to the Internet to exchange and process information without human intervention. Although the IoT is similar to the existing Ubiquitous or the object to object intelligent network (O2N), i.e., Machine to Machine (M2M), in that objects are able to communicate with each other without relying on humans, it expands the concept of the M2M to the Internet to connect every object existing in the world to a network to allow them to communicate to one another anytime, anywhere.

SUMMARY

The present disclosure provides a vehicle, hub apparatus, and communication system including the vehicle and hub apparatus, capable of preventing functional collisions between the vehicle and a terminal due to overlap of control targets in controlling networked external devices.

In accordance with one aspect of the present disclosure, a communication system comprises: a hub apparatus configured to communicate with at least one external device; a terminal configured to establish a connection with the hub apparatus to control the at least one external device; and a vehicle configured to establish a connection with the hub apparatus to control the at least one external device, determine whether there is an overlapped control target with a control target of the terminal among the at least one external device, and when it is determined that there is the overlapped control target, take priority to control the overlapped control target.

The vehicle may request a control target list of the terminal from the terminal if the ignition of the vehicle is turned on.

The terminal may send the control target list of the terminal to the vehicle, and the vehicle may compare the control target list of the terminal sent from the terminal with a control target list of the vehicle to determine whether there is an overlapped control target with a control target of the terminal among the at least one external device.

The vehicle may request control priority over the overlapped control target from the terminal when it is determined that there is the overlapped control target.

The terminal may receive an input of acceptance of the request upon reception of the request for the control priority over the overlapped control target from the vehicle.

The terminal may send an acceptance signal to the vehicle when the acceptance of the request is input, and release a right to control over the overlapped control target.

The vehicle may communicate with the hub apparatus to control the at least one external device including the overlapped control target when receiving the acceptance signal from the terminal.

The vehicle may release a right to control over the overlapped control target when no acceptance signal is received from the terminal.

The terminal may reestablish a right to control over the overlapped control target when the ignition of the vehicle is turned off.

The hub apparatus may send setting information for the overlapped control target to the terminal when the ignition of the vehicle is turned off, and the terminal may update setting information stored in advance for the overlapped control target with the setting information received from the hub apparatus.

The vehicle may send setting information for the overlapped control target to the terminal when the ignition of the vehicle is turned off, and the terminal may update setting information stored in advance for the overlapped control target with the setting information received from the vehicle.

In accordance with another aspect of the present disclosure, a communication system comprises: a vehicle configured to send a control instruction for at least one external device; a terminal configured to send a control instruction for at least one external device; and a hub apparatus configured to determine whether there is an overlapped control target between the vehicle and the terminal, and give control priority over the overlapped control target to the vehicle when it is determined that there is the overlapped control target.

The hub apparatus may determine whether a distance between the vehicle and the terminal is less than a predetermined value when there is the overlapped control target.

The hub apparatus may determine the distance between the vehicle and the terminal based on information of a position of the vehicle and a position of the terminal.

The hub apparatus may give control priority over the overlapped control target to the vehicle when the determined distance is less than the predetermined value.

The vehicle may release a connection established with the hub apparatus when the ignition of the vehicle is turned off, and the hub apparatus may give control priority over the overlapped control target to the terminal when the connection with the vehicle is released.

The hub apparatus may send setting information for the overlapped control target to the terminal when the ignition of the vehicle is turned off, and the terminal may update setting information stored in advance for the overlapped control target with the setting information received from the hub apparatus.

The vehicle may send setting information for the overlapped control target to the terminal when the ignition of the vehicle is turned off, and the terminal may update setting information stored in advance for the overlapped control target with the setting information received from the vehicle.

In accordance with another aspect of the present disclosure, a vehicle comprises: a vehicle communication device configured to communicate with at least one of a terminal and a hub apparatus; and a vehicle controller configured to determine whether there is an overlapped control target between the terminal and the vehicle when the ignition of the vehicle is turned on, and set up control priority over the overlapped control target when there is the overlapped control target.

In accordance with another aspect of the present disclosure, a hub apparatus comprises: a hub communication device configured to communicate with at least one external device and receive respective control commands for the external device from a vehicle and a terminal; and a hub controller configured to determine whether there is an overlapped control target between the vehicle and the terminal, and give control priority over the overlapped control target to the vehicle when it is determined that there is the overlapped control target.

BRIEF DESCRIPTION OF THE DRAWINGS

The above and other objects, features and advantages of the present disclosure become more apparent to those of ordinary skill in the art by describing in detail exemplary embodiments thereof with reference to the accompanying drawings, in which.

DETAILED DESCRIPTION OF EXEMPLARY EMBODIMENTS

The principle and embodiments of the present disclosure will now be described with reference to accompanying drawings.

Figure 1:
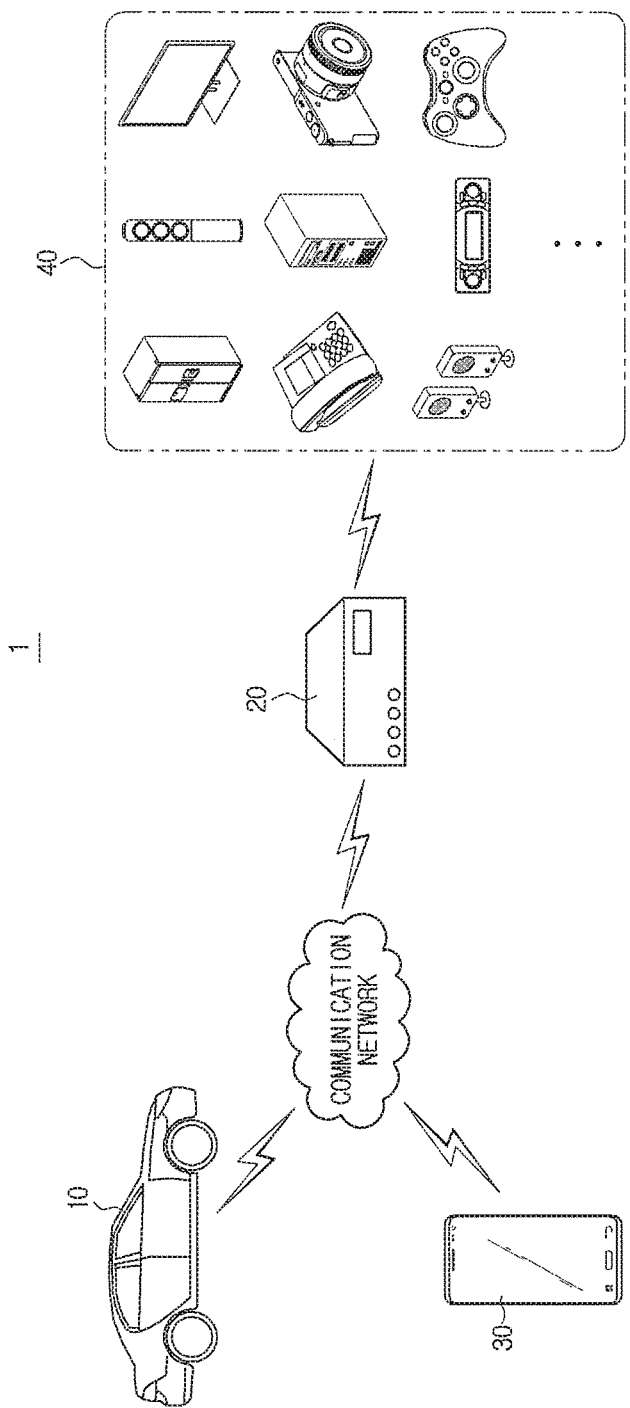
FIG. 1 shows a communication system of Internet of Things (IoT) devices, according to an embodiment of the present disclosure.

FIG. 1 shows a communication system of Internet of Things (IoT) devices, according to an embodiment of the present disclosure.

Referring to FIG. 1, a communication system 1 may include IoT devices 40 (hereinafter, simply referred to as devices), a hub apparatus 20 that communicates with the devices 40, and a vehicle 10 and a terminal 30, which are connected to the hub apparatus 20 over a communication network.

The IoT refers to an intelligent technology and service to allow all objects including humans, things, etc., to be connected based on the Internet to exchange information between human and object or between objects. Technical factors for the IoT may include a sensing technology to obtain information from tangible objects and surroundings, a wired/wireless communication and network infrastructure technology to support connection of the object to the Internet, a service interface technology to process and handle information or converge various technologies to fit various service areas and forms, a security technology to prevent elements of the IoT such as mass data from being hacked or prevent leakage of information, and the like.

The IoT devices 40 that may access a network based on the IoT may include many different kinds of home appliances such as washers, refrigerators, microwaves, televisions, air conditioners, etc., and all kinds of things such as digital cameras, computers, laptops, various sensors, audio systems for vehicle, digital meters, door lock systems, game devices, speakers, security devices, etc. Furthermore, various modules and sensors included in vehicles may also belong to the 'things', and there are no limitations on the types of 'things'.

To implement an IoT communication environment, there is a need for a hub apparatus 20 to access a network server while communicating with the plurality of devices 40.

The plurality of devices 40 may be connected to the network server via the hub apparatus 20, and may implement the IoT based on frequency bands or time slots assigned by the hub apparatus 20.

The plurality of devices 40 may implement the IoT mutually or via the network server connected through the hub apparatus 20.

The hub apparatus 20 may communicate with the devices 40 in various communication schemes. For example, the hub apparatus 20 may perform communication in at least one of wireless fidelity (Wi-Fi), Bluetooth, Near Field Communication (NFC), Zigbee, and Z-WAVE.

The hub apparatus 20 may first establish a connection with each device 40 by sending various connection information to each device 40, and may be able to control each device 40 by sending and receiving various information to and from each device 40. The hub apparatus 20, such as an Ethernet hub, active hub, network hub, repeater hub, and multiport repeater, may be a network hardware device for connecting multiple Ethernet devices together and making them act as a single network segment. The hub apparatus 20 may have multiple input/output (I/O) ports, in which a signal introduced at the input of any port appears at the output of every port except the original incoming.

The terminal 30 may communicate with the hub apparatus 20 over a communication network. Specifically, the terminal 30 may control the devices 40 by sending and receiving various signals about the devices 40 through the connection with the hub apparatus 20.

The user may receive information regarding the devices 40 by an application installed in the terminal 30 and control the devices 40 based on the information.

In this case, the terminal 30 refers to a computer or a portable terminal that may access the Internet over a network.

The computer includes a notebook, laptop, tablet personal computer (tablet PC), slate PC, etc., equipped with a WEB browser.

The portable terminal may be a wireless communication device that guarantees portability and mobility, including any type of handheld based wireless communication device, such as a Personal Communication System (PCS), a Global System for Mobile communications (GSM), a Personal Digital Cellular (PDC), a Personal Handyphone System (PHS), a Personal Digital Assistant (PDA), an international Mobile Telecommunication (IMT)-2000 device, a Code Division Multiple Access (CDMA)-2000 device, a W-CDMA device, a Wireless Broadband Internet (WiBro) terminal, a smart phone, etc., and a wearable device, such as a watch, a ring, a bracelet, a necklace, glasses, a contact lens, a head mounted device (HMD), etc.

Like the terminal 30 that is able to control the devices 40 through communication with the hub apparatus 20, the vehicle 10 may also communicate with the hub apparatus 20 over a communication network. Specifically, the vehicle 10 may control the devices 40 by sending and receiving various signals about the devices 40 through a connection established with the hub apparatus 20.

Furthermore, the vehicle 10 may send and receive various information by communication with the terminal 30. For this, the vehicle 10 may perform wireless communication or wired communication via a cable with the terminal 30.

The conventional IoT-based communication systems allow the user to control an external device with his/her terminal and even in the vehicle. Especially; there may be an occasion when the user gets in the vehicle and both the terminal of the user and the vehicle may control external devices at the same time. In this case, if the external devices connected for communication are the same one, i.e., if the control targets of the terminal and the vehicle are the same, functions between the terminal and the vehicle might collide.

An occasion when the terminal 30 and the vehicle 10 of the communication system 1 may use the IoT without a functional collision between the terminal 30 and the vehicle 10 will be focused in the following description.

Figure 2:
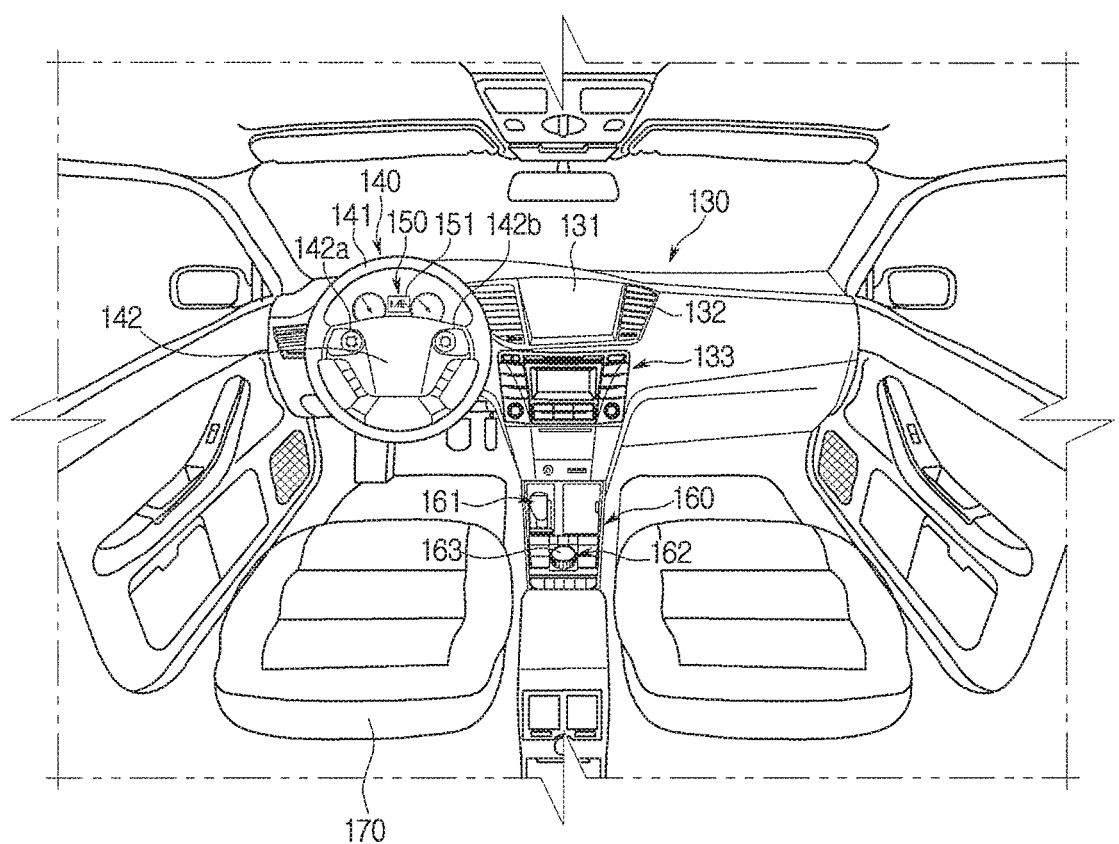
FIG. 2 illustrates internal features of a vehicle, according to an embodiment of the present disclosure.

FIG. 2 illustrates internal features of a vehicle, according to an embodiment of the present disclosure.

Referring to FIG. 2, the vehicle 10 may include a gear box 160, a center fascia 130, and a dashboard including e.g., a steering wheel 140 and an instrument panel 150.

The gear box 160 includes a gear lever 161 for gear shifting. As shown in FIG. 2, there are a dial 163 enabling the user to control functions of a multimedia system including a navigation system or an audio system 133, or major functions of the vehicle 10, and an input unit 162 having various buttons installed on the gear box 160.

In the center fascia 130 arranged on the dashboard, an air conditioner 131, an audio system 133, a display 131, and the like may be installed.

The air conditioner keeps the atmosphere inside the vehicle 10 pleasant by controlling temperature, humidity, air cleanness, and air flows inside the vehicle 10. The air conditioner may include at least one vent installed in the center fascia 130 for venting air. There may also be buttons or dials installed in the center fascia 130 to control e.g., the air conditioner. The driver or the user may control the air conditioner of the vehicle 10 by means of the buttons or dials arranged on the center fascia 130. The air conditioner may also be controlled by the dial 163 or buttons of the input unit 162 installed on the gear box 160.

The audio system 133 may include a control panel on which a number of buttons are arranged to perform functions of the audio system 133. The audio system 133 may provide a radio mode for radio listening and a media mode for reproducing audio files.

The display 131 may display a user interface (UI) that provides the driver with information regarding the vehicle 10 in the form of images or text. For this, the display 131 may be provided by being buried in the center fascia 130.

However, an example of how to install the display is not limited thereto. For example, the display 131 may be provided separately from the center fascia 130 of the vehicle 10.

Furthermore, the display 131 may display various control screens related to control of devices installed in the vehicle 10. For example, the display 131 may display various control screens related to control of the air conditioner 132 and the audio system 133.

In addition, the display 131 may be used for the navigation system that may perform integrated audio, video, and navigation functions to correspond to an audio, video, navigation (AVN) system.

The steering wheel 140 provided on the dashboard is a device to control a traveling direction of the vehicle 10, including a rim 141 to be held by the driver and a spoke 142 connected to a steering system of the vehicle 100 for connecting the rim 141 to a hub of a rotation shaft for steering. In an embodiment, control devices 142a, 142b may be arranged on the spoke 142 to control various devices in the vehicle 100, e.g., the audio system. Furthermore, the dashboard may include various instrument panels 150 to indicate speed, engine rpm, an amount of fuel left, etc. The instrument panel 150 may include an instrument panel display 151 for displaying information regarding vehicle conditions, information regarding driving of the vehicle, information relating to operation of the multimedia system, etc.

Figure 3:
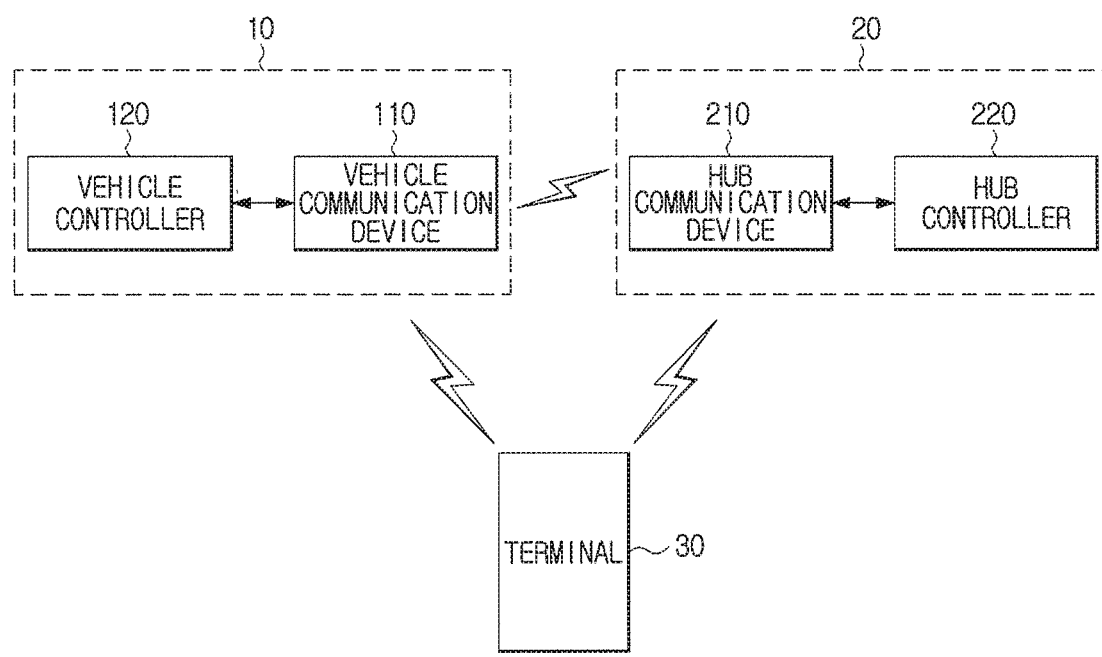
FIG. 3 is a control block diagram of a communication system, according to an embodiment of the present disclosure.

FIG. 3 is a control block diagram of a communication system, according to an embodiment of the present disclosure.

Referring to FIG. 3, the communication system 1 may include the vehicle 10, the terminal 30, and the hub apparatus 20 able to communicatively connect the vehicle 10 and the terminal 30.

The vehicle 10 may include a vehicle communication device 110 capable of sending and receiving information to and from at least one of the terminal 30 and the hub apparatus 20, and a vehicle controller 120 for controlling the vehicle communication device 110 and various other devices of the vehicle 10.

The vehicle communication device 110 may enable the vehicle 10 to exchange information with at least one of the hub apparatus 20 and the terminal 30 over a communication network. Especially, when the vehicle communication device 110 communicates with the hub apparatus 20, the communication may be performed through an external server (not shown).

Specifically, the vehicle communication device 110 may send control instructions to the device 40 connected to the hub apparatus 20 through communication with the hub apparatus 20, Furthermore, the vehicle communication device 110 may receive information about the device 40.

Moreover, the vehicle communication device 110 may send and receive information to and from the terminal 30 through communication with the terminal 30.

For this, the vehicle communication device 110 may include a wireless communication module, a short-range communication module, or a wired communication module. Alternatively, the vehicle communication device 110 may include a combination of the wireless communication module, the short-range communication module, and the wired communication module, and may include a Telematics module to provide a Telematics service. These communication modules may include a control circuit such as an integrate circuit (IC) chip. Further, the vehicle communication device 110 is a hardware device capable of transmitting an analog or digital signal over wire or wirelessly and may include one or more components that enable communication with an external device. Examples of the vehicle communication device 110 include Bluetooth devices, infrared devices, modem, network card (using Ethernet), smartphone, Wi-Fi devices (using a Wi-Fi router), etc.

The wireless communication module may include a wireless communication interface having a communication port to connect the network and the vehicle communication device 110, a transmitter to send various signals, and a receiver to receive various signals. The wireless communication module may further include a signal conversion module that may modulate a digital control signal output from the controller through the wireless communication interface to an analog wireless signal and demodulate an analog wireless signal received through the wireless communication interface to a digital control signal, under the control of the controller.

The wireless communication module may include any wireless communication module for supporting various wireless communication schemes, such as a Wi-Fi module, a Wibro module, and/or a global system for mobile communication (GSM) module, a code division multiple access (CDMA) module, a wideband code division multiple access (WCDMA) module, a time division multiple access (TDMA) module, a long term evolution (LTE) module, etc.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), etc.

The vehicle controller 120 may control various devices of the vehicle 10, and especially, control the vehicle communication device 110 to send various control instructions to the device 40.

Furthermore, the vehicle controller 120 may control the vehicle communication device 110 to exchange information regarding setup of a right to control over the device 40 with at least one of the terminal 30 and the hub apparatus 20. In the present disclosure, the vehicle controller 120 includes an electronic control unit (ECU), and the vehicle communication device 110 may be connected as a separate device or embedded in the vehicle controller 120.

The hub apparatus 20 may include a hub communication device 210 capable of exchanging information with at least one of the vehicle 10 and the terminal 30, and a hub controller 220 for controlling various functions of the hub apparatus 20.

The hub communication device 210 may enable the hub apparatus 20 to exchange information with at least one of the vehicle 10 and the terminal 30 over a communication network.

Furthermore, the hub communication device 210 may exchange information with the device 40 over a communication network. Specifically, the hub communication device 210 may receive setting information of the device 40 from the device 40, and receive a control command about the device 40 from the terminal 30 and forward the control command to the device 40.

For this, the hub communication device 210 may include a wireless communication module, a short-range communication module, or a wired communication module. The hub communication device 210 may operate like the vehicle communication device 110 does. These communication modules may include a control circuit such as an integrated circuit (IC) chip. Further, the hub communication device 210 is a hardware device capable of transmitting an analog or digital signal over wire or wirelessly and may include one or more components that enable communication with an external device.

The hub controller 220 may control various devices in the hub apparatus 20, and especially, control the hub communication device 210 to receive various control commands about the device 40 and forward the control commands to the device 40.

Furthermore, the hub controller 220 may control the hub communication device 210 to exchange information regarding setup and change of a right to control over the device 40 with at least one of the vehicle 10 and the terminal 30.

The terminal 30 may also exchange the information regarding setup and change of the controlling right with at least one of the vehicle 10 and the hub apparatus 20.

Furthermore, the terminal 30 may send a control command about the device 40 to the hub apparatus 20 and set up a right to control over the device 40.

Operations of the vehicle, the terminal, and the hub apparatus in the communication system in accordance with embodiments will now be described in detail with reference to FIGS. 4 to 7.

FIGS. 4 to 7 are flowcharts illustrating operation of a communication system, according to embodiments of the present disclosure. All of or a part of the steps method and/or operations of the foregoing embodiments can be realized using computer hardware and computer programs executed thereon.

Figure 4:
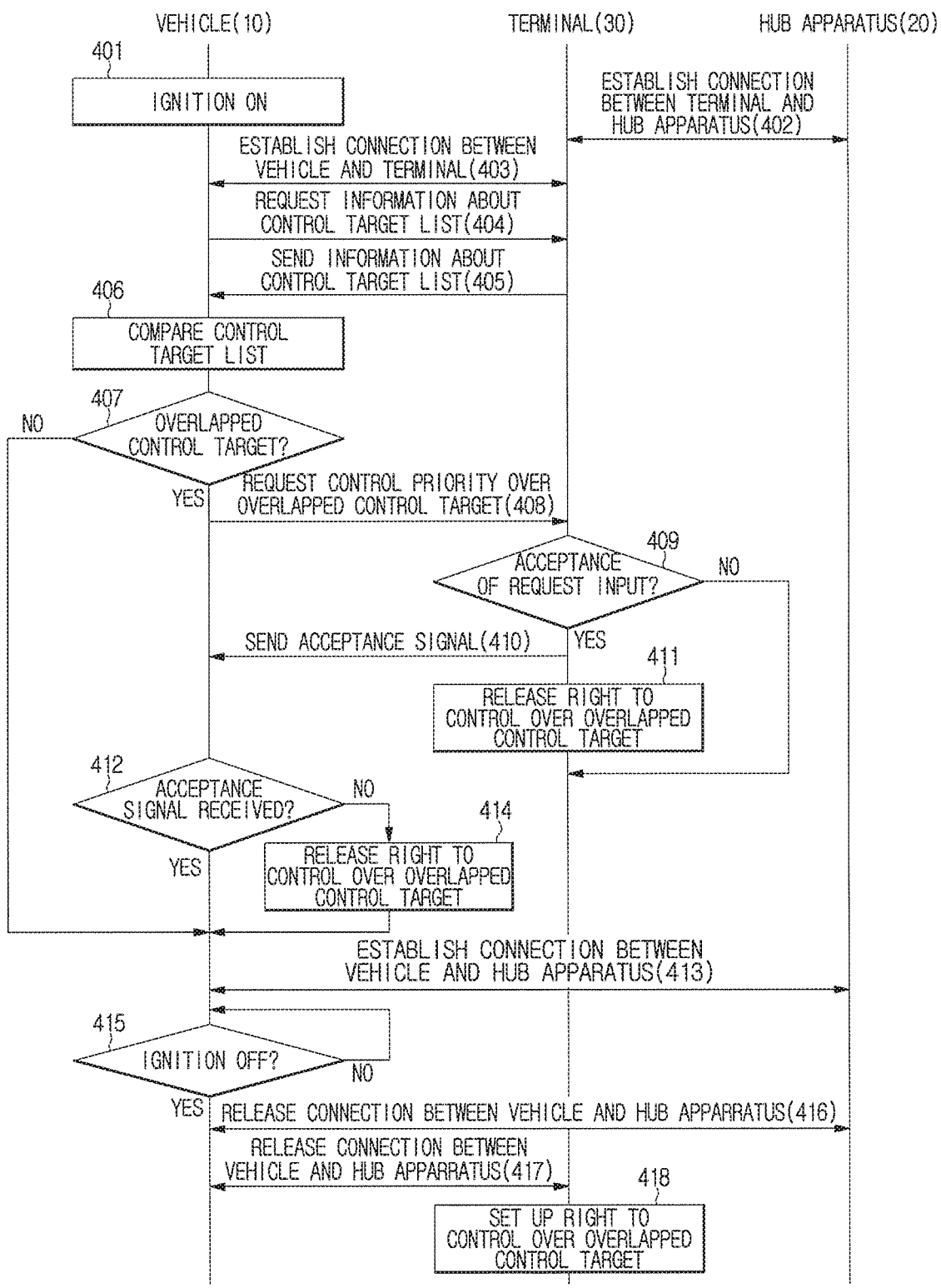
FIG. 4 is a flowchart illustrating operation of a communication system, according to an embodiment of the present disclosure.

Referring to FIG. 4, when the ignition of the vehicle 10 in the communication system 1 is turned on in 401, the vehicle controller 120 establishes a connection between the vehicle 10 and the terminal 30 in 403.

Once the connection of the terminal 30 of the user is established with the hub apparatus 20, the vehicle controller 120 requests information about a control target list from the terminal 30 through the vehicle communication device 110, in 404. The control target refers to a target to receive the control command through the hub apparatus 20, i.e., a device that becomes a target to be controlled among the devices 40 connected to the IoT.

In response to the request from the vehicle 10, the terminal 30 sends information about a control target list, in 405, and the vehicle controller 120 compares the received control target list of the terminal 30 with a control target list of the vehicle 10, in 406.

Based on the comparison of the control target lists in 406, the vehicle controller 120 determines whether there is an overlapped control target among the control targets of the vehicle 10 and the terminal 30, in 407.

If there is no overlapped control target in 407, the vehicle controller 120 establishes a connection between the vehicle 10 and the hub apparatus 20, in 413. In this case, since there is no overlap in control targets between the terminal 30 and the vehicle 10, the problem of a functional collision may not arise.

On the contrary, if there is any overlapped control target, in 407, the vehicle controller 120 requests control priority over the overlapped control target from the terminal 30, in 408.

Upon reception of the request for the control priority over the overlapped control target 408, the terminal 30 determines whether there is an input to accept the request, in 409. The determination of whether there is an input to accept the request may be made based on whether acceptance of the request has been input through an extra input device.

If there is an input to accept the request in 409, the terminal 30 sends an acceptance signal to the vehicle 10 in 410 and releases the control right of the terminal 30 over the overlapped control target in 411.

In this case, the terminal 30 may not be able to send a control command to the overlapped control target, and specifically, the connection established between the terminal 30 and the hub apparatus 20 may be deactivated for the overlapped control target. The control command for the overlapped control target may be sent only by the vehicle 10, so that a functional collision between the terminal 30 and the vehicle 10 may not occur.

Subsequently, the vehicle controller 120 determines whether the acceptance signal has been received, in 412, and establishes a connection between the vehicle 10 and the hub apparatus 20 in 413 if the acceptance signal is received in 412.

In this regard, since the vehicle controller 120 has not released the controlling right separately, it may control the devices 40 included in the control target list including the overlapped control target through the connection established with the hub apparatus 20.

If the acceptance signal is not received in 412, the vehicle controller 120 releases the right to control over the overlapped control target, in 414. The vehicle controller 120 establishes a connection between the vehicle 10 and the hub apparatus 20 in 413 while releasing the right to control over the overlapped control target in 414.

In this case, the vehicle controller 120 may not be able to send a control command to the overlapped control target, and specifically, the connection established between the vehicle 10 and the hub apparatus 20 may be deactivated for the overlapped control target. The control command for the overlapped control target may be sent only by the terminal 30, so that a functional collision between the terminal 30 and the vehicle 10 may not occur.

Subsequently, the vehicle 10 determines whether the ignition is turned off in 415, and releases the connection established between the vehicle 10 and the hub apparatus 20 in 416 if the ignition is turned off.

Once the connection established between the vehicle 10 and the hub apparatus 20 is released, the vehicle 10 is not able to send a control command to the device 40.

After the connection established between the vehicle 10 and the hub apparatus 20 is released, the vehicle controller 120 releases the connection established between the vehicle 10 and the terminal 30, in 417.

Once the connection established between the vehicle 10 and the terminal 30 is released, the terminal 30 may set up a right to control over the overlapped control target in 418. Specifically, if the terminal 30 has been deactivated for the connection to the overlapped control target, it may set up a right to control over the overlapped control target by re-activating the connection.

In this way, functional collisions between the terminal 30 and the vehicle 10 may not occur and after the ignition of the vehicle 10 is turned off, control by the terminal 30 is continued again, so the convenience for the user may increase.

Figure 5:
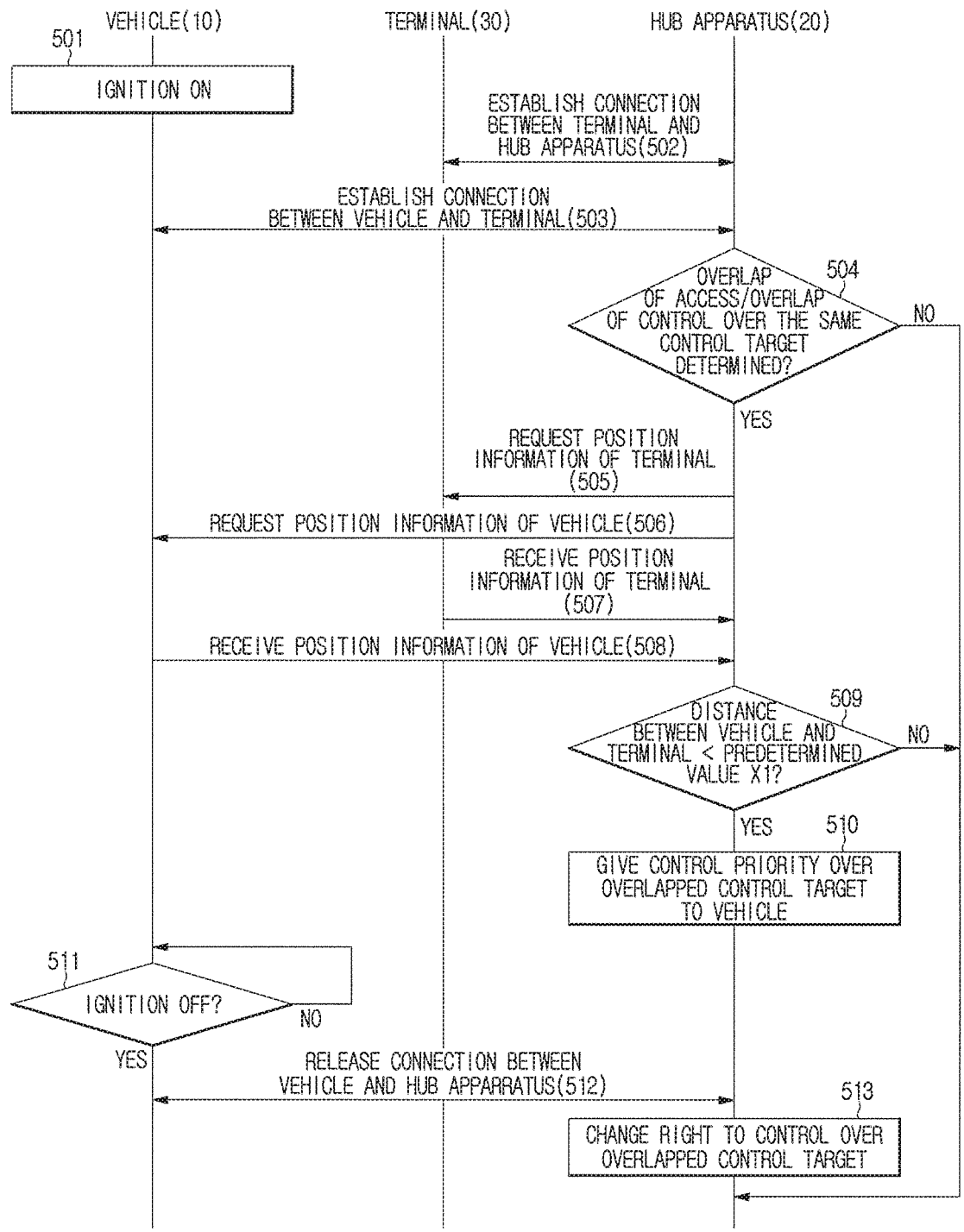
FIG. 5 is a flowchart illustrating operation of a communication system, according to another embodiment of the present disclosure.

Referring to FIG. 5, when the ignition of the vehicle 10 in the communication system 1 is turned on in 501, the vehicle controller 120 establishes a connection between the vehicle 10 and the terminal 30 in 503.

If a connection is established between the terminal 30 and the hub apparatus 20 in 502, the hub controller 220 of the hub apparatus 20 determines whether there is an overlapped control target, in 504. In this case, the control target may be at least one of the devices 40.

Specifically, if connections from the vehicle 10 and the terminal 30 to the same control target are established, the hub controller 220 may determine that there is an overlapped control target.

Furthermore, if control commands for the same control target are received from both the vehicle 10 and the terminal 30, the hub controller 220 may determine that there is an overlapped control target.

If it is determined that there is an overlapped control target, the hub controller 20 sends a request for information about the position of the terminal 30 to the terminal 30 in 505 and sends a request for information about the position of the vehicle 10 to the vehicle 10 in 506.

Subsequently, upon reception of the information about the position of the terminal 30 and the position of the vehicle 10 in 507 and 508, the hub controller 220 determines whether a distance between the vehicle 10 and the terminal 30 is less than a predetermined value X1, in 509.

Specifically, the hub controller 220 may determine the distance between the vehicle 10 and the terminal 30 based on the respective position information received from the vehicle 10 and the terminal 30 and determine whether the determined distance is less than the predetermined value X1.

If it is determined that the distance between the vehicle 10 and the terminal 30 is less than the predetermined value X1 in 509, the hub controller 220 may give control prior over an overlapped control target to the vehicle 10.

Specifically, if control commands for the same control target are received from both the vehicle 10 and the terminal 30, the hub controller 220 may send a control command received from the vehicle 10 to the control target first.

Accordingly, an overlapped device between the vehicle 10 and the terminal 30 among the devices 40 may be controlled by the vehicle 10 first.

In this way, the control command received from the terminal 30 may be sent to the control target only if there is no control command received from the vehicle 10, so that a functional collision for the same control target between the vehicle 10 and the terminal 30 may be prevented.

Subsequently, the vehicle controller 120 determines whether the ignition of the vehicle 10 is turned off in 511, and releases the connection established between the vehicle 10 and the hub apparatus 20 in 512 if the ignition of the vehicle 10 is turned off.

Once the connection established between the vehicle 10 and the hub apparatus 20 is released, the hub apparatus 20 may change the right to control over the overlapped control target in 513.

Specifically, the hub apparatus 20 may change the controlling right from the vehicle 10 to the terminal 30 by giving the control priority over the overlapped control target that has been given to the vehicle 10 to the terminal 30.

In this way, functional collisions between the terminal 30 and the vehicle 10 may not occur and after the ignition of the vehicle 10 is turned off, control by the terminal 30 is continued again, so the user convenience may increase.

Figure 6:
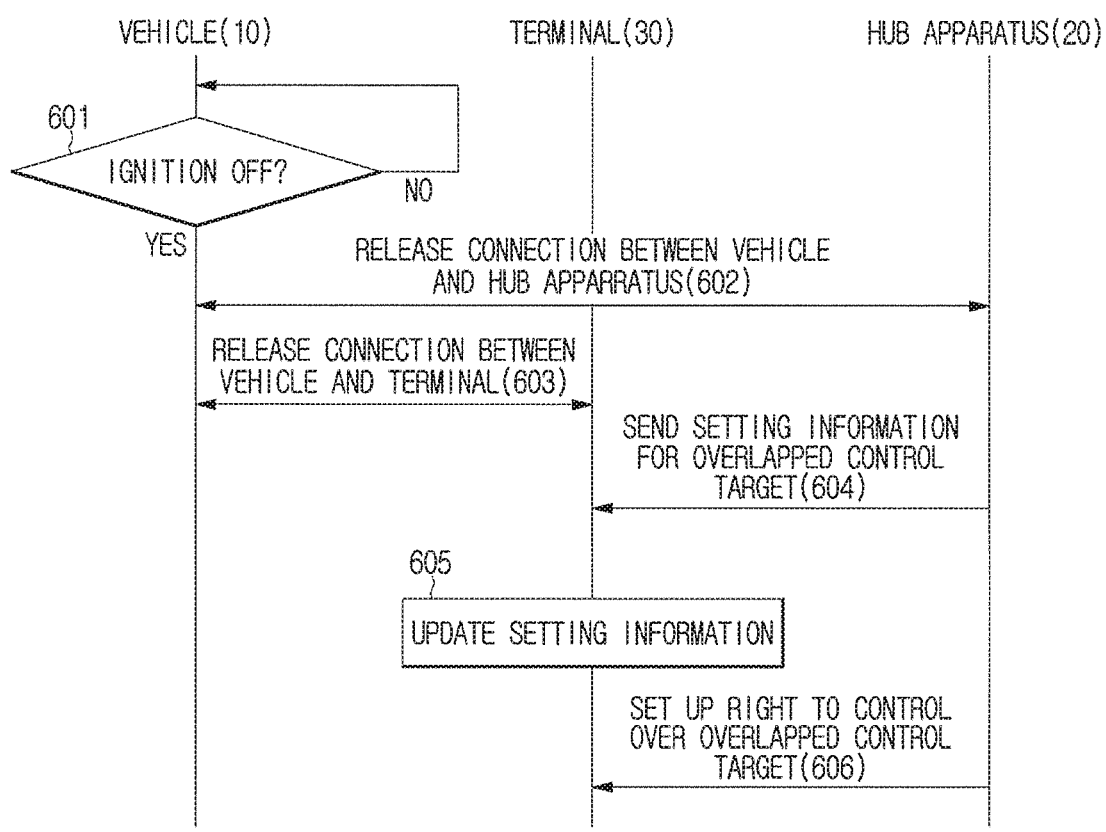
FIG. 6 is a flowchart illustrating operation of a communication system, according to another embodiment of the present disclosure.

Referring to FIG. 6, after the operation to prevent functional collisions between the vehicle 10 and the terminal 30 in the communication system 1 in accordance with an embodiment of the present disclosure, the vehicle controller 120 determines whether the ignition of the vehicle 10 is turned off, in 601.

In this case, the operation to prevent functional collisions between the vehicle 10 and the terminal 30 may include operation performed in 401 to 413 of FIG. 4 or operation performed in 501 to 510 of FIG. 5.

After the operation to prevent functional collisions between the vehicle 10 and the terminal 30, if the ignition of the vehicle 10 is turned off, the connection established between the vehicle 10 and the hub apparatus 20 is released, in 602.

After the connection established between the vehicle 10 and the hub apparatus 20 is released, the vehicle controller 120 releases the connection established between the vehicle 10 and the terminal 30, in 603.

Once the connection established between the vehicle 10 and the terminal 30 is released, the hub controller 20 of the hub apparatus 20 sends setting information for the overlapped control target to the terminal 30, in 604. In this case, the setting information for the overlapped control target may include a setting value for the overlapped control target according to a control command.

Upon reception of the setting information from the hub apparatus 20, the terminal 30 updates setting information, in 605. Specifically, if old setting information stored in the terminal 30 is different from the setting information received from the hub apparatus 20, the terminal 30 may replace the old setting information with the setting information received from the hub apparatus 20.

Subsequently, the hub apparatus 20 may set up a right to control over an overlapped control target, in 606.

Specifically, the hub controller 220 may give the right to control over the overlapped control target to the terminal 30. Furthermore, if a connection established between the terminal 220 and the hub apparatus 30 has been deactivated, the hub controller 220 may set up a right to control over the overlapped control target to be given to the terminal 30 by re-activating the connection between the terminal 30 and the hub apparatus 30.

In this way, by updating the setting information for the overlapped control target, the overlapped control target may be controlled based on the newest setting information regardless of a change in controlling subject due to a change of the controlling right.

Figure 7:
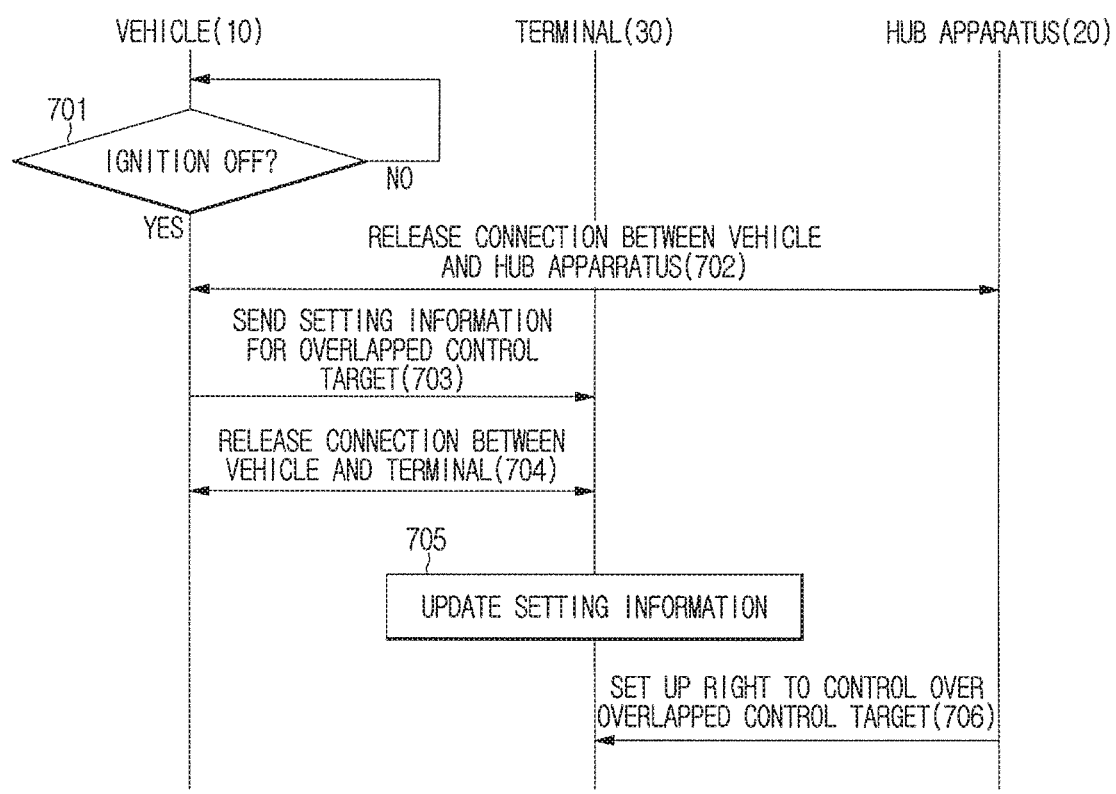
FIG. 7 is a flowchart illustrating operation of a communication system, according to another embodiment of the present disclosure.

Referring to FIG. 7, after the operation to prevent functional collisions between the vehicle 10 and the terminal 30 in the communication system 1 in accordance with an embodiment of the present disclosure, the vehicle controller 120 determines whether the ignition of the vehicle 10 is turned off, in 701.

In this case, the operation to prevent functional collisions between the vehicle 10 and the terminal 30 may include operation performed in 401 to 413 of FIG. 4 or operation performed in 501 to 510 of FIG. 5.

After the operation to prevent functional collisions between the vehicle 10 and the terminal 30, if the ignition of the vehicle 10 is turned off, the connection established between the vehicle 10 and the hub apparatus 20 is released, in 702.

Once the connection established between the vehicle 10 and the hub apparatus 20 is released, the vehicle controller 120 sends setting information for the overlapped control target to the terminal 30, in 703.

After sending the setting information for the overlapped control target to the terminal 30, the vehicle controller 120 releases the connection established between the vehicle 10 and the terminal 30, in 704.

The terminal 30 updates setting information based on the setting information for the overlapped control target received from the vehicle 10, in 705. Specifically, if old setting information stored in the terminal 30 is different from the setting information received from the vehicle 10, the terminal 30 may replace the old setting information with the setting information received from the vehicle 10.

After the terminal 30 updates the setting information, the hub apparatus 20 may set up a right to control over an overlapped control target, in 706.

Specifically, the hub controller 220 may give the right to control over the overlapped control target to the terminal 30. Furthermore, if a connection established between the terminal 220 and the hub apparatus 30 has been deactivated, the hub controller 220 may set up a right to control over the overlapped control target to be given to the terminal 30 by re-activating the connection between the terminal 30 and the hub apparatus 30.

In this way, by updating the setting information for the overlapped control target, the overlapped control target may be controlled based on the newest setting information regardless of a change in controlling subject due to a change of the controlling right.

According to embodiments of a communication system including a vehicle, a terminal, and a hub apparatus, a functional collision between the vehicle and the terminal due to overlap of a control target may be prevented, thereby increasing convenience for the user.

The embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A communication system comprising:
    a hub apparatus configured to communicate with at least one external device;
    a terminal configured to establish a connection with the hub apparatus to control the at least one external device; and
    a vehicle comprising a vehicle processor configured to:
    establish a connection with the hub apparatus to control the at least one external device;
    determine whether there is an overlapped control target with a control target of the terminal among the at least one external device; and
    when it is determined that there is the overlapped control target, take priority to control the overlapped control target so as to prevent functional collision between the vehicle and the terminal for control of the at least one external device,
    wherein the vehicle processor is configured to request a control target list of the terminal from the terminal if an ignition of the vehicle is turned on, and
    wherein the terminal is configured to send the control target list of the terminal to the vehicle, and wherein the vehicle processor is configured to compare the control target list of the terminal sent from the terminal with a control target list of the vehicle to determine whether there is the overlapped control target with the control target of the terminal among the at least one external device.

2. The communication system of claim 1, wherein the vehicle processor is configured to request control priority over the overlapped control target from the terminal when it is determined that there is the overlapped control target.

3. The communication system of claim 2, wherein the terminal is configured to receive an input of acceptance of the request upon reception of the request for the control priority over the overlapped control target from the vehicle.

4. The communication system of claim 3, wherein the terminal is configured to send an acceptance signal to the vehicle when the acceptance of the request is input, and release a right to control over the overlapped control target.

5. The communication system of claim 4, wherein the vehicle processor is configured to communicate with the hub apparatus to control the at least one external device including the overlapped control target when receiving the acceptance signal from the terminal.

6. The communication system of claim 4, wherein the vehicle processor is configured to release a right to control over the overlapped control target when no acceptance signal is received from the terminal.

7. The communication system of claim 4, wherein the terminal is configured to reestablish a right to control over the overlapped control target when an ignition of the vehicle is turned off.

8. The communication system of claim 1, wherein the hub apparatus is configured to send setting information for the overlapped control target to the terminal when an ignition of the vehicle is turned off, and wherein the terminal is configured to update setting information stored in advance for the overlapped control target with the setting information received from the hub apparatus.

9. The communication system of claim 1, wherein the vehicle processor is configured to send setting information for the overlapped control target to the terminal when an ignition of the vehicle is turned off, and wherein the terminal is configured to update setting information stored in advance for the overlapped control target with the setting information received from the vehicle.

10. A communication system comprising:
a vehicle comprising a vehicle processor configured to send a control command for at least one external device;
a terminal configured to send a control command for the at least one external device; and
a hub apparatus configured to determine that there is an overlapped control target between the vehicle and the terminal when control commands for a same control target are received from both the vehicle and the terminal, and give control priority over the overlapped control target to the vehicle when it is determined that there is the overlapped control target so as to prevent functional collision between the vehicle and the terminal for control of the at least one external device,
wherein the hub apparatus is configured to give control priority over the overlapped control target to the vehicle when a distance between the vehicle and the terminal is less than a predetermined value.

11. The communication system of claim 10, wherein the hub apparatus is configured to determine the distance between the vehicle and the terminal based on information of a position of the vehicle and a position of the terminal.

12. The communication system of claim 10, wherein the vehicle processor is configured to release a connection established with the hub apparatus when an ignition of the vehicle is turned off, and wherein the hub apparatus is configured to give control priority over the overlapped control target to the terminal when the connection with the vehicle is released.

13. The communication system of claim 10, wherein the hub apparatus is configured to send setting information for the overlapped control target to the terminal when an ignition of the vehicle is turned off, and wherein the terminal is configured to update setting information stored in advance for the overlapped control target with the setting information received from the hub apparatus.

14. The communication system of claim 10, wherein the vehicle processor is configured to send setting information for the overlapped control target to the terminal when an ignition of the vehicle is turned off, and wherein the terminal is configured to update setting information stored in advance for the overlapped control target with the setting information received from the vehicle.

15. A vehicle comprising:
a vehicle communication device configured to communicate with at least one of a terminal and a hub apparatus, the hub apparatus being configured to communicated with the at least one external device, and the terminal being configured to connect with the hub apparatus for control of the at least one external device; and
a vehicle controller comprising a vehicle processor configured to determine whether there is an overlapped control target between the terminal and the vehicle when an ignition of the vehicle is turned on, and set up control priority over the overlapped control target when there is the overlapped control target so as to prevent functional collision between the vehicle and the terminal for control of the at least one external device,
wherein the vehicle processor is configured to request a control target list of the terminal from the terminal if an ignition of the vehicle is turned on, and
wherein the terminal is configured to send the control target list of the terminal to the vehicle, and wherein the vehicle processor is configured to compare the control target list of the terminal sent from the terminal with a control target list of the vehicle to determine whether there is the overlapped control target with the control target of the terminal among the at least one external device.

16. A hub apparatus comprising:
a hub communication device configured to communicate with at least one external device and receive respective control commands for the at least one external device from a vehicle and a terminal;
a hub controller configured to determine whether there is an overlapped control target between the vehicle and the terminal when control commands for a same control target are received from both the vehicle and the terminal, and give control priority to control the overlapped control target to the vehicle when it is determined that there is the overlapped control target so as to prevent functional collision between the vehicle and the terminal for control of the at least one external device; and
wherein the hub apparatus is configured to give control priority over the overlapped control target to the vehicle when a distance between the vehicle and the terminal is less than a predetermined value.

* * * * *